(12) United States Patent
Delgross et al.

(10) Patent No.: US 8,458,404 B1
(45) Date of Patent: Jun. 4, 2013

(54) PROGRAMMABLE CACHE ACCESS PROTOCOL TO OPTIMIZE POWER CONSUMPTION AND PERFORMANCE

(75) Inventors: Joseph Delgross, Chandler, AZ (US); Sujat Jamil, Gilbert, AZ (US); R. Frank O'Bleness, Tempe, AZ (US); Tom Hameenanttila, Phoenix, AZ (US); David E. Miner, Chandler, AZ (US)

(73) Assignee: Marvell International Ltd., Hamilton (BM)

(*) Notice: Subject to any disclaimer, the term of this patent is extended or adjusted under 35 U.S.C. 154(b) by 705 days.

(21) Appl. No.: 12/540,788

(22) Filed: Aug. 13, 2009

Related U.S. Application Data

(60) Provisional application No. 61/088,892, filed on Aug. 14, 2008, provisional application No. 61/088,896, filed on Aug. 14, 2008, provisional application No. 61/088,901, filed on Aug. 14, 2008.

(51) Int. Cl.
*G06F 12/00* (2006.01)
(52) U.S. Cl.
USPC .................. 711/128; 711/167; 711/E12.017
(58) Field of Classification Search
None
See application file for complete search history.

(56) References Cited

U.S. PATENT DOCUMENTS

| | | | | |
|---|---|---|---|---|
| 5,025,366 A * | 6/1991 | Baror | | 711/128 |
| 5,822,758 A * | 10/1998 | Loper et al. | | 711/130 |
| 6,081,871 A * | 6/2000 | Hwangbo | | 711/118 |
| 6,412,038 B1 * | 6/2002 | Mehalel | | 711/128 |
| 6,735,683 B2 * | 5/2004 | Kawasaki et al. | | 712/43 |
| 7,013,407 B2 * | 3/2006 | Johansen et al. | | 713/401 |
| 2001/0025333 A1 * | 9/2001 | Taylor et al. | | 711/103 |
| 2005/0144403 A1 * | 6/2005 | Jeddeloh | | 711/154 |
| 2008/0034024 A1 * | 2/2008 | Savell et al. | | 708/313 |
| 2008/0256304 A1 * | 10/2008 | Kezuka et al. | | 711/145 |
| 2009/0150890 A1 * | 6/2009 | Yourst | | 718/102 |
| 2012/0151156 A1 * | 6/2012 | Citron et al. | | 711/154 |

\* cited by examiner

*Primary Examiner* — Reginald Bragdon
*Assistant Examiner* — Daniel Bernard

(57) ABSTRACT

A programmable cache and cache access protocol that can be dynamically optimized with respect to either power consumption or performance based on a monitored performance of the cache. A monitoring unit monitors cache misses, load use penalty, and/or other performance parameter, and compares the monitored values against a set of one or more predetermined thresholds. Based on the comparison results, a cache controller configures the programmable cache to operate in a parallel mode, to increase cache performance at the cost of greater power consumption, or in a serial mode, to conserve power at the cost of unnecessary performance. A banked cache memory that supports aligned and unaligned instruction fetches using a banked access strategy, and a cache access controller that includes a prefetch capability are also described.

20 Claims, 13 Drawing Sheets

PROGRAMMABLE CACHE ACCESS PROTOCOL TO OPTIMIZE POWER CONSUMPTION AND PERFORMANCE

INCORPORATION BY REFERENCE

This application claims the benefit of U.S. Provisional Application No. 61/088,892, "METHOD AND APPARATUS FOR PROGRAMMABLE CACHE ACCESS PROTOCOL TO OPTIMIZE POWER CONSUMPTION AND PERFORMANCE," U.S. Provisional Application No. 61/088,896, "METHOD AND APPARATUS TO ALLOW UNALIGNED INSTRUCTION FETCH USING A BANKED ACCESS STRATEGY," and U.S. Provisional Application No. 61/088,901, "METHOD AND APPARATUS FOR AN INSTRUCTION CACHE PREFETCHER," filed by Joseph Delgross, Sujat Jamil, R. Frank O'Bleness, David E. Miner and Tom Hameenanttila on Aug. 14, 2008, which are incorporated herein by reference in their entirety.

BACKGROUND

Cache memory is used by processing units to reduce the average time to access memory, i.e., stored instructions and/or data, and thereby avoid processing delays, or latency, due to the processor waiting on the receipt of required instructions and/or data. Cache memory can be accessed more quickly than main memory or external memory stores due to its closer physical proximity to the CPU and a configuration that is designed for fast access with reduced overhead. Therefore by moving blocks of data from main memory, or external memory to cache memory, prior to use, the majority of CPU memory accesses may be faster cache memory accesses, thereby allowing the CPU to process data and instructions at frequencies closer to the designed operational frequency of the CPU.

SUMMARY

A programmable cache and cache access protocol is described that can be dynamically optimized with respect to either power consumption or performance, i.e., speed of response, based on a monitored performance of the cache. A cache controller dynamically configures the cache to operate in either a serial processing mode, for optimized power consumption, or a parallel processing mode, for optimized performance. A monitoring unit monitors cache misses, load use penalty, and/or other performance parameter, and dynamically reconfigures the programmable cache to operate in parallel mode if the monitored performance parameters exceed a maximum threshold in order to increase cache performance at the cost of greater power consumption. Further, the monitoring unit can dynamically reconfigure the programmable cache to operate in serial mode if the monitored performance parameters are at or below a predetermined threshold, in order to conserve power at the cost of potential performance.

A banked cache memory that supports aligned and unaligned instruction fetches using a banked access strategy is also described. An array structure that requires unaligned access, e.g., such as an instruction cache, can be organized into banks, e.g., an even bank for the low-order word of an aligned access, and an odd bank for the high order word. Each bank can hold a portion of the complete data required, e.g., in an instruction cache, each bank can hold one of two instructions stored within a cache access that is stored across the two banks. The banks can then be independently addressed. In cases where an unaligned access is desired, the address to the odd bank can be incremented. For example, for the unaligned access case, multiplexers can be used to swap the data from each bank to assemble the final quantity. Often these multiplexers can be an extension of other multiplexers already present in a typical design, e.g., such as source selection multiplexers. The approach allows for aligned and unaligned data accesses and therefore increased cycle performance with minimal impact to frequency performance.

A cache access controller with prefetch capability is also described. Typically the size of the lowest-level cache in a microprocessor has a direct impact on the frequency performance and cycle performance of the microprocessor. To achieve fast frequency performance, the cache can be made small, yet a small cache could have a cycle performance impact due to lower hit rate. One solution to this issue is to have multi-levels of cache, e.g., in which the closest level can be made smaller if there is a larger cache behind it to offset the low-hit rate of the smaller cache. However there may still be cycle performance degradation if the lowest level cache consistently needs to get data from the next level. An approach is described for addressing such a condition by providing a mechanism by which data can be prefetched from an outer level of a cache to the inner level. More specifically, the described mechanism performs such prefetching without incurring a hardware structural hazard related to the translation lookaside buffer (TLB) structure.

In one example embodiment a programmable cache is described that includes, a tag array unit that forwards either a delayed wayhit result or a non-delayed wayhit result based on a configurable control parameter, a data array unit that generates either a single data array cache line or multiple data array cache lines based on the configurable control parameter, and a cache controller that configures the tag array unit and the data array unit to operate in either in parallel or in series based on the configurable control parameter.

In a second example embodiment, a programmable cache is described that includes, a tag array unit that forwards either a delayed wayhit result or a non-delayed wayhit result based on a configurable control parameter, a data array unit that generates either a single data array cache line or multiple data array cache lines based on the configurable control parameter, and a cache controller that configures the tag array unit and the data array unit to operate in either parallel or in series based on the configurable control parameter. The tag array unit can further include, an N-way tag array that includes N tag arrays, and a wayhit comparator that initiates a search of the N-way tag array based on a received request tag and compares results received from the N tag arrays to produce a wayhit result, which indicates which of the tag arrays contains data matching the request tag.

In a third example embodiment, a method of controlling a programmable cache is described that may include, forwarding either a delayed wayhit result or a non-delayed wayhit result based on a configurable control parameter, generating either a single data array cache line or multiple data array cache lines based on the configurable control parameter, and configuring a tag array unit and a data array unit to operate in either in parallel or in series based on the configurable control parameter.

BRIEF DESCRIPTION OF THE DRAWINGS

Example embodiments of a programmable cache and cache access protocol that optimize power consumption and performance, a banked cache memory that supports aligned and unaligned instruction fetches using a banked access strategy, and a cache access controller that includes a prefetch capability are described hereinbelow with reference to the following drawings, wherein like numerals designate like elements, and wherein.

DETAILED DESCRIPTION OF EMBODIMENTS

Figure 1:
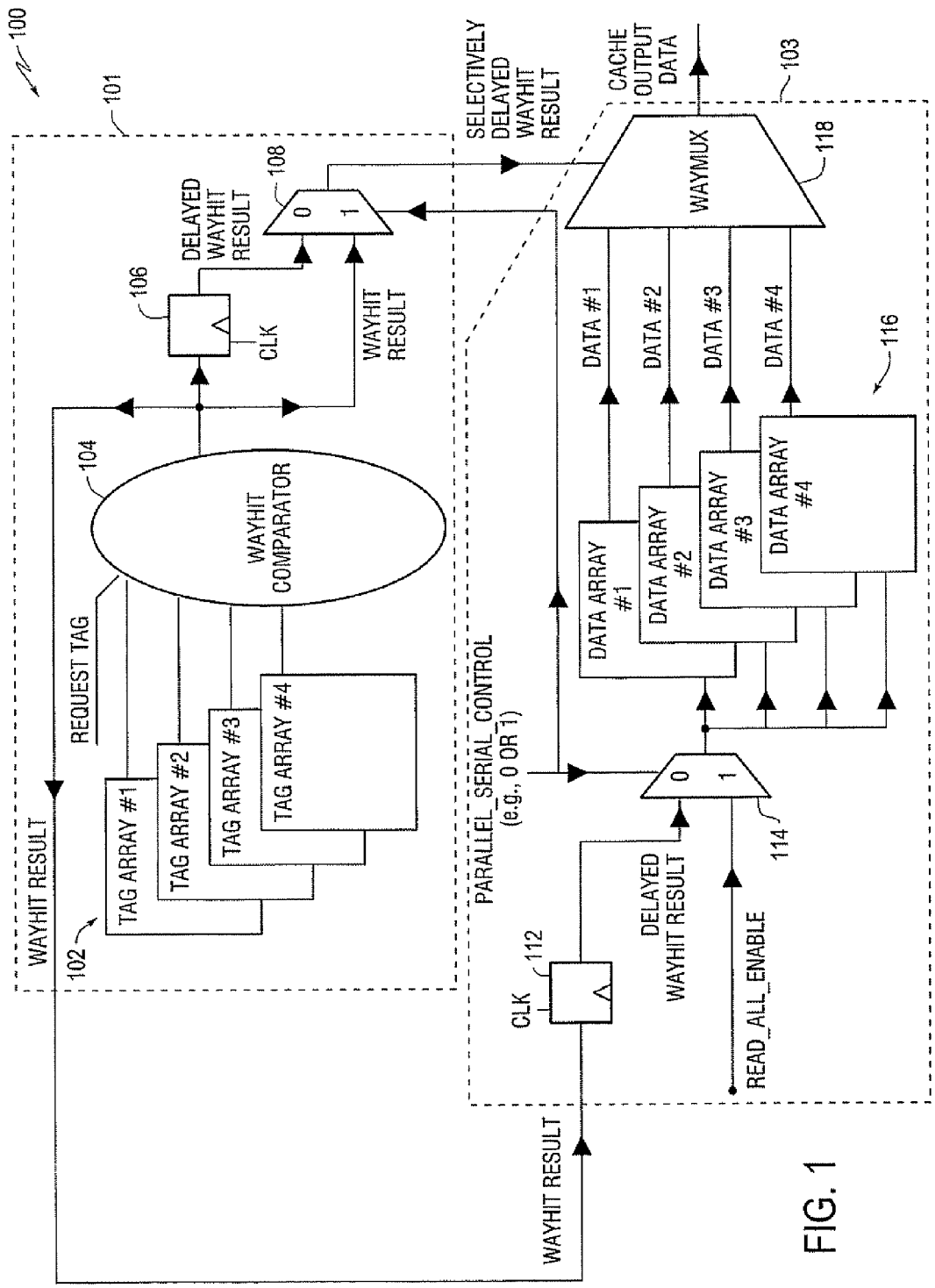
FIG. 1 is a schematic diagram of a programmable cache in accordance with an embodiment of the disclosure.

FIG. 1 is a schematic diagram of a programmable cache in accordance with an embodiment of the disclosure that optimizes power consumption and performance. As shown in FIG. 1, programmable cache 100 includes a tag array unit 101 that forwards either a delayed wayhit result or a non-delayed wayhit result based on a configurable control parameter, a data array unit 103 that generates either a single data array cache line or multiple data array cache lines based on the configurable control parameter, and a cache controller (not shown) that configures the tag array unit and the data array unit to operate either in parallel or in series based on the configurable control parameter.

As further shown in FIG. 1, tag array unit 101 includes an N-way tag array 102, a wayhit comparator 104, a wayhit result delay module 106 and a wayhit multiplexer 108. Data array unit 103 includes a read_enable delay module 112, a data array multiplexer 114, an N-way data array 116, where N is any integer number, and a waymux multiplexer 118.

In operation, the tag array unit and the data array unit operate in series or in parallel to locate, retrieve and deliver cache lines from N-way data array 116 in response to receipt of a cache tag request. When operating in parallel mode, programmable cache 100 responds to a cache request with a requested cache line within 1 cache cycle (e.g., best performance), but (potentially) at the cost of reading all N-ways of the data array in parallel and, therefore, increased power consumption. When operating in serial mode, programmable cache 100 responds to a cache request with a request cache line within 2 cache cycles (e.g., reduced performance), but by only reading the specific way of the data array that contains the data, at reduced power consumption. A cache controller monitors cache performance and sets the programmable cache to operate in either serial mode or parallel mode by changing a value stored in a configurable control parameter, parallel_serial_cntrl. For example, the cache controller can include a performance monitoring unit that monitors cache performance and sets the configurable control parameter based on the determined cache performance. In one example embodiment, the performance monitoring unit, which can be implemented in hardware and/or software, monitors cache misses and may set parallel_serial_cntrl to direct tag array unit 101 and data array unit 103 to operate in parallel mode if a rate of cache misses exceeds a predetermined threshold, or to operate in serial mode if the rate of cache misses is at or below the predetermined threshold. In one example embodiment, the performance monitoring unit monitors a load use penalty and sets parallel_serial_cntrl to direct tag array unit 101 and data array unit 103 to operate in parallel mode if the load use penalty exceeds a predetermined threshold, or to operate in serial mode if the a load use penalty is at or below the predetermined threshold. In this manner, programmable cache 100 can be configured to operate, in parallel mode, with greater power consumption, when needed to improve operational performance; however, programmable cache 100 can be configured to operate in serial mode with reduce speed with reduced power consumption, in order to conserve power when such operational performance is not required.

Referring again to FIG. 1, in operation, wayhit comparator 104 receives a request tag from the cache controller and submits an N-way tag search of tag array 102 based on the received request tag. Wayhit comparator 104 compares the N-way tag results to the received tag request and generates a wayhit result that identifies which, if any, of the tag arrays returned a tag value that matches the request tag. Wayhit comparator 104 forwards the generated wayhit result to wayhit result delay module 106, wayhit multiplexer 108, and read_enable delay module 112. Wayhit result delay module 106 receives and stores a received wayhit result for one cache clock cycle, before forwarding the stored wayhit result as a delayed wayhit result to wayhit multiplexer 108 on a next cache clock cycle. Wayhit multiplexer 108 receives a wayhit result from wayhit comparator 104, receives a delayed wayhit result from wayhit result delay module 106, receives signal parallel_serial_cntrl from the cache controller, and forwards either the wayhit result or delayed wayhit result to waymux multiplexer 118 based on the value of parallel_serial_cntrl. For example, if parallel_serial_cntrl is set to parallel mode, waymux multiplexer 118 forwards the wayhit result received directly from wayhit comparator 104 to waymux multiplexer 118. However, if parallel_serial_cntrl is set to serial mode, waymux multiplexer 118 forwards the delayed wayhit result received from wayhit result delay module 106 to waymux multiplexer 118.

Still referring again to FIG. 1, in operation, read_enable delay module 112 receives the wayhit result generated by wayhit comparator 104 and stores the received wayhit result for one cache clock cycle, before forwarding the stored wayhit result as a delayed wayhit result to a data array multiplexer 114. Data array multiplexer 114 receives a default read_al-l_enable, receives a delayed wayhit result from read_enable delay module 112 and receives signal parallel_serial_cntrl from the cache controller, and forwards either the read_all_enable or the delayed wayhit result to N-way data array 116 based on the value of parallel_serial_cntrl. For example, if parallel_serial_cntrl is set to parallel mode, data array multiplexer 114 forwards the read_all_enable received directly to N-way data array 116. However, if parallel_serial_cntrl is set to serial mode, data array multiplexer 114 forwards the delayed wayhit result received from read_enable delay module 112 to N-way data array 116.

On receipt of a read_all_enable, each of the N data arrays in N-way data array 116 forwards a cache line corresponding to the current request tag to waymux multiplexer 118; however, on receipt of a delayed wayhit result, only the data array within N-way data array 116 that matches the wayhit result forwards a cache line corresponding to the current request tag to waymux multiplexer 118. Waymux multiplexer 118 forwards a single cache line, of the one or more cache lines received from the respective N data arrays of N-way data array 116, as the cache output based on the wayhit result or the delayed wayhit result received from wayhit multiplexer 108.

As a result of the above operations, when the cache controller configures programmable cache 100 operate in parallel mode, waymux multiplexer 118 uses a wayhit result generated during the current cache cycle to select one of N cache lines received from the respective data arrays of N-way data array 116 as the cache output for the current cache cycle. Although the process is time efficient in terms of the number of cache clock cycles required to generate a cache output, the process is power inefficient in that power is used to generate a cache line from all N data arrays of N-way data array 116, when only a one of the N cache lines is required.

When the cache controller configures programmable cache 100 operate in serial mode, N-way data array 116 is activated based on a delayed wayhit result value, which is based on the wayhit result generated in a previous cache cycle. Therefore, only a single data array is activated and only a single cache line is forwarded to waymux multiplexer 118. However, waymux multiplexer 118 selects and forwards a cache line based on a delayed wayhit result, i.e., the same wayhit result used to select which data array was activated to send a cache line to waymux multiplexer 118, therefore the single cache line presented by N-way data array 116 is forwarded by waymux multiplexer 118 as the cache output. Although such a process requires two cache cycles to complete, the process is power efficient in that only a single data array is activated.

Figure 2:
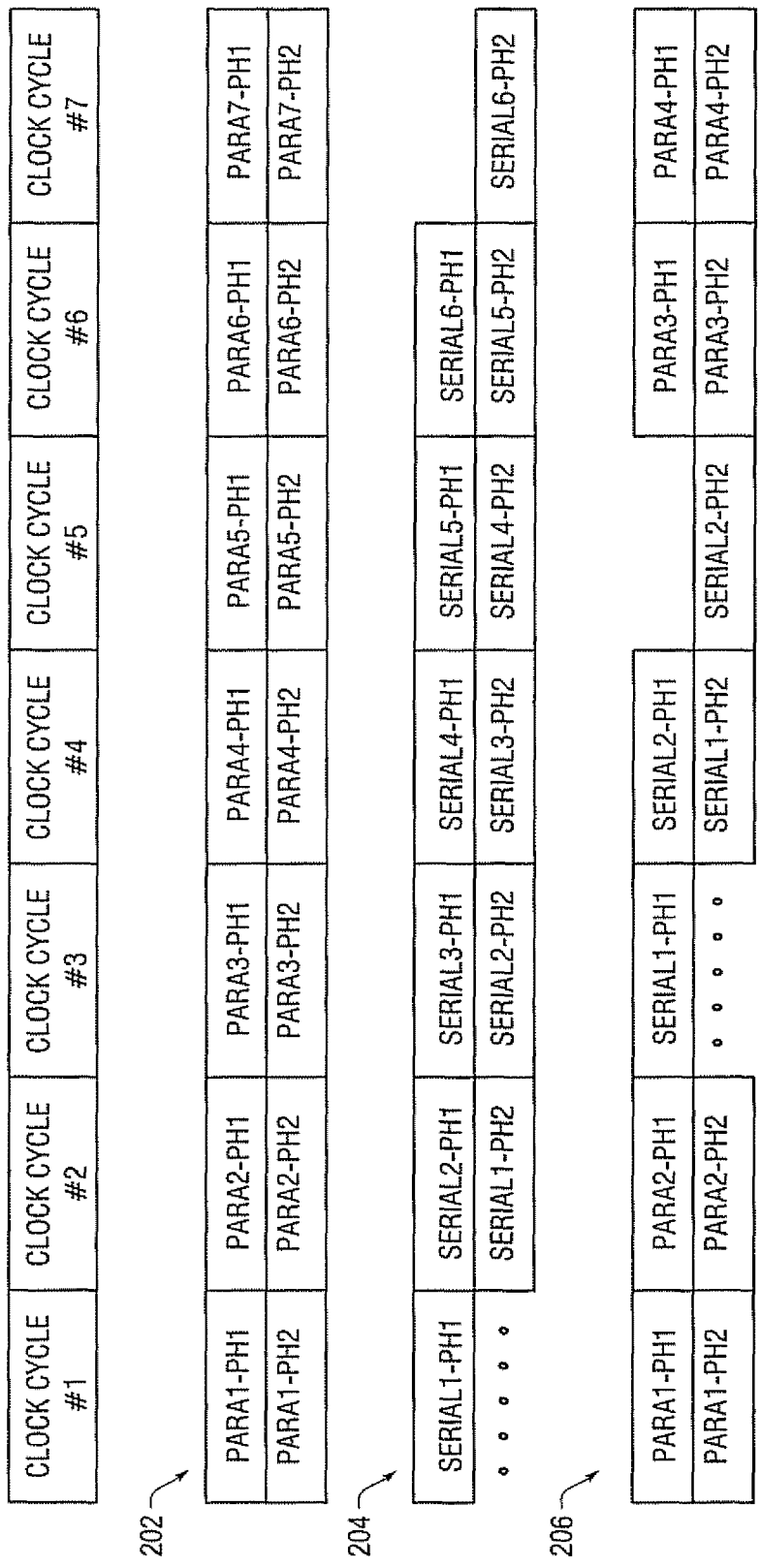
FIG. 2 is a comparison of the number of cache accesses that can be made by the programmable cache of FIG. 1 operating in parallel and/or serial mode.

FIG. 2 is a comparison of the number of cache accesses that can be made by the programmable cache 100 of FIG. 1 operating in parallel and/or serial mode. As shown in FIG. 2 at 202, a programmable cache 100 operating in parallel mode can perform 7 full cache accesses during a period of 7 cache clock cycles, whereas, as shown in FIG. 2 at 204, a programmable cache 100 operating in serial mode can perform only 6 full cache accesses during a period of 7 cache clock cycles. However, as also shown in FIG. 2 at 204, after the initial 1 clock cycle delay, programmable cache 100 continues to produce a cache result every clock cycle. Further, as shown in FIG. 2, at 206, although there is a 1 cache cycle delay in the production of a cache result on transition to serial mode, e.g., as shown at clock cycle #3, there is no delay in the production of a cache result on transition from serial mode to parallel mode.

As described above, the cache controller of programmable cache 100 directs programmable cache 100 to operate in serial mode on determining that the cache is not introducing operational delays, e.g., on determining that the number of cache misses and/or the load use penalty is at or below a predetermined maximum threshold. Therefore, introduction of a 1 cycle delay on transitioning to serial mode from parallel mode can be adjusted for in the predetermined threshold. Further, as described above, the cache controller of programmable cache 100 directs programmable cache 100 to operate in parallel mode on determining that the cache is introducing operational delays, e.g., on determining that the number of cache misses and/or the load use penalty is above a predetermined threshold. Therefore, the ability to transition from serial mode to parallel mode without the introduction of an additional penalty, should a transition from serial mode to parallel mode be required, reduces the risk associated with operating cache processor 100 in serial mode. Further, the one clock cycle delay associated with the startup of serial mode operations is negligible to overall cache throughput. Assuming that the programmable cache is accessed continuously, as would likely be the case when a system that the programmable cache supports is operating under a heavy cache access load, such continuous access further reduces the impact of operating the programmable cache in serial mode.

Figure 3:
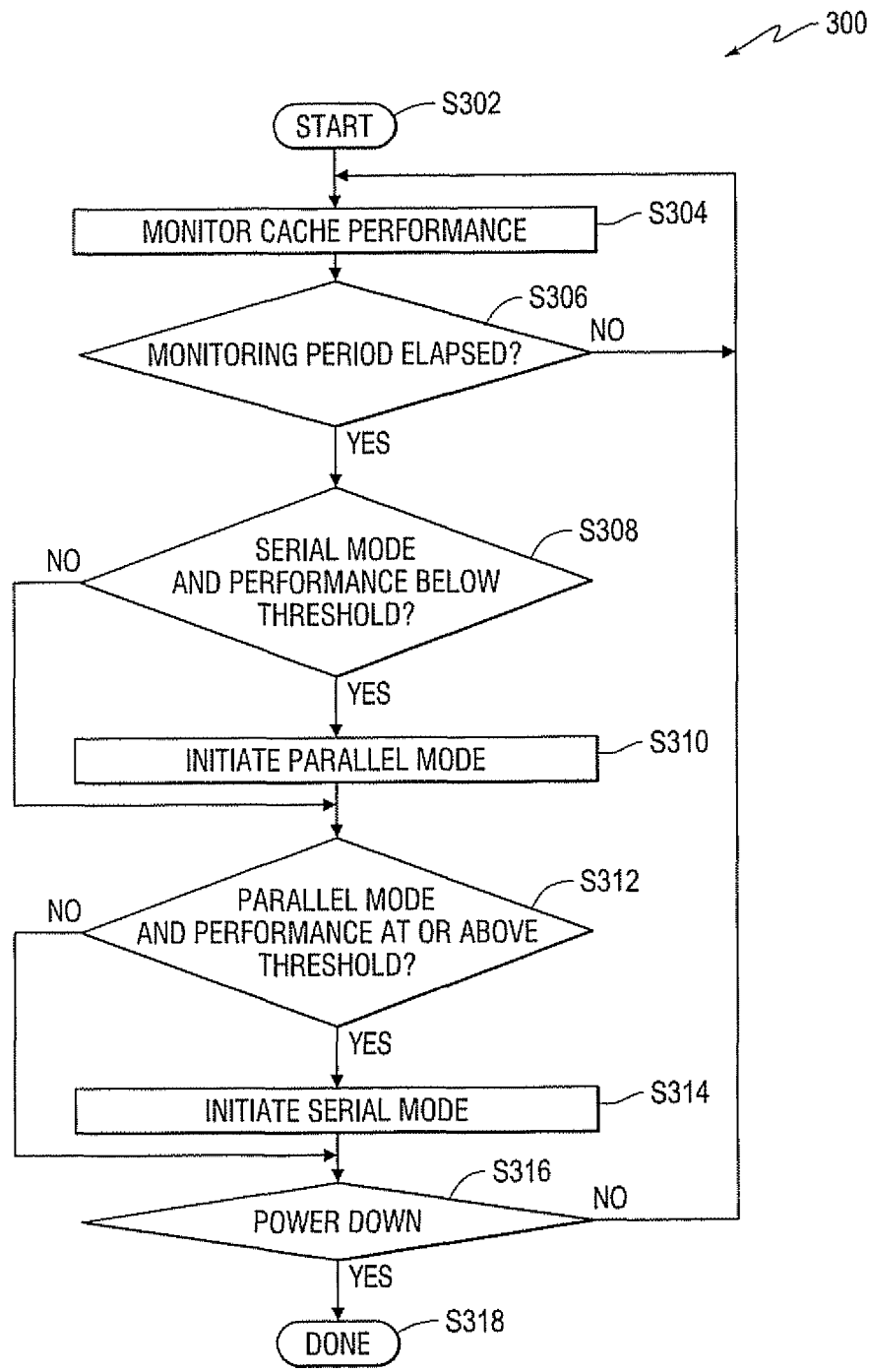
FIG. 3 is a flow-chart of an example process flow that may be performed by the programmable cache of FIG. 1 to control transitions of the programmable cache between parallel and serial operating modes.

FIG. 3 is a flow-chart of an example process flow that can be performed by the programmable cache 100 of FIG. 1 to control transitions of the programmable cache between parallel and serial operating modes based on a monitoring of the programmable cache's performance. As shown in FIG. 3, operation of process 300 begins at step S302 and proceeds to step S304.

In step S304, a cache controller within programmable cache 100 monitors cache performance, such as cache misses and/or measures of load use penalty, and maintains a count, or log, of performance related events, and operation of the process continues to step S306.

If, in step S306, the cache controller determines that the monitoring period has elapsed, operation of the process continues to step S308; otherwise, operation of the process continues to step S304.

If, in step S308, the cache controller determines that the current operating mode of the programmable cache is serial mode, and the cache performance during the last monitored period is less than a predetermined threshold, operation of the process continues to step S310; otherwise, operation of the process continues to step S312.

In step S310, the cache controller sets the programmable cache to parallel mode by setting the configurable parallel/serial control parameter, i.e., parallel_serial_cntrl in the embodiments described above, to indicate parallel mode, and operation of the process continues to step S312.

If, in step S312, the cache controller determines that the current operating mode of the programmable cache is parallel mode, and the cache performance during the last monitored period is at or above a predetermined threshold, operation of the process continues to step S314; otherwise, operation of the process continues to step S316.

In step S314, the cache controller sets the programmable cache to serial mode by setting the configurable parallel/serial control parameter, i.e., parallel_serial_cntrl in the embodiments described above, to indicate serial mode, and operation of the process continues to step S316.

If, in step S316, the cache controller determines that a power-down has been requested, operation of the process continues to step S318 and terminates; otherwise, operation of the process continues to step S304.

Figure 4:
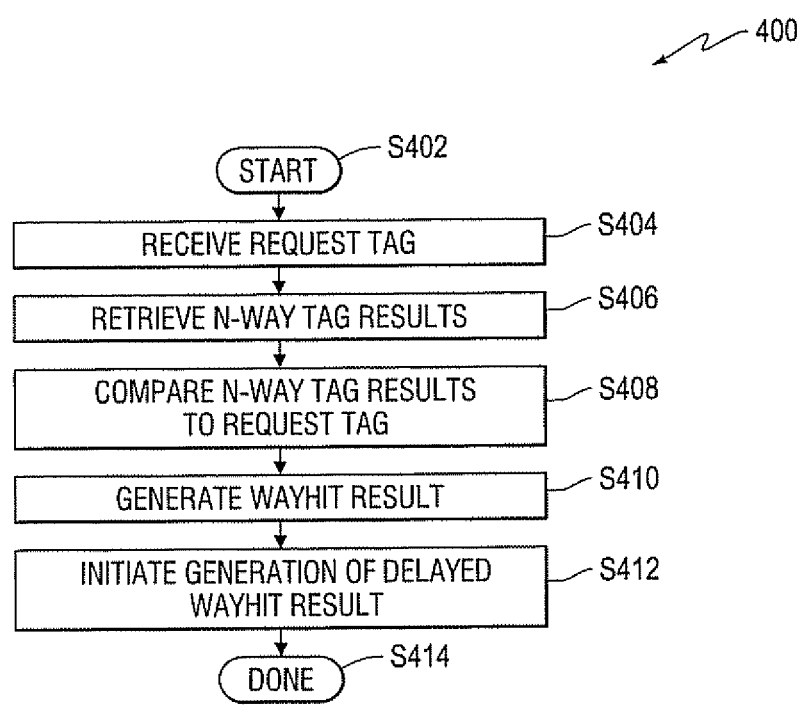
FIG. 4 is a flow-chart of an example process flow that may be performed by a tag array unit within the programmable cache of FIG. 1 when operating in serial mode.

FIG. 4 is a flow-chart of an example process flow that can be performed by a tag array unit within the programmable cache of FIG. 1 during a first cache clock cycle of an in series cache access, i.e., a cache access is initiated when the parallel_serial_control parameter has been set to serial mode by the cache controller based on a monitored status of the cache performance, as described above with respect to FIG. 3. As shown in FIG. 4, operation of process 400 begins at step S402 and proceeds to step S404.

In step S404, wayhit comparator 104 receives a request tag, and operation of the process continues to step S406.

In step S406, wayhit comparator 104 retrieves N-way tag results from tag array unit 102 based on a tag request based on the received request tag, and operation of the process continues to step S408.

In step S408, wayhit comparator 104 compares the N-way tag results received from tag array unit 102, and operation of the process continues to step S410.

In step S410, wayhit comparator 104 generates a way hit result, based on the comparison of the received request tag and the N-way tag results in step S408, and operation of the process continues to step S412.

In step S412, wayhit result delay module 106 stores the way hit result generated in step S410, for use in the next cache clock cycle as a delayed way hit result provided to wayhit multiplexer 108, and read_enable delay module 112 stores the way hit result generated in step S410, for use in the next cache clock cycle as a delayed wayhit result provided to data array multiplexer 114, and operation of the process continues to step S414 and terminates.

Figure 5:
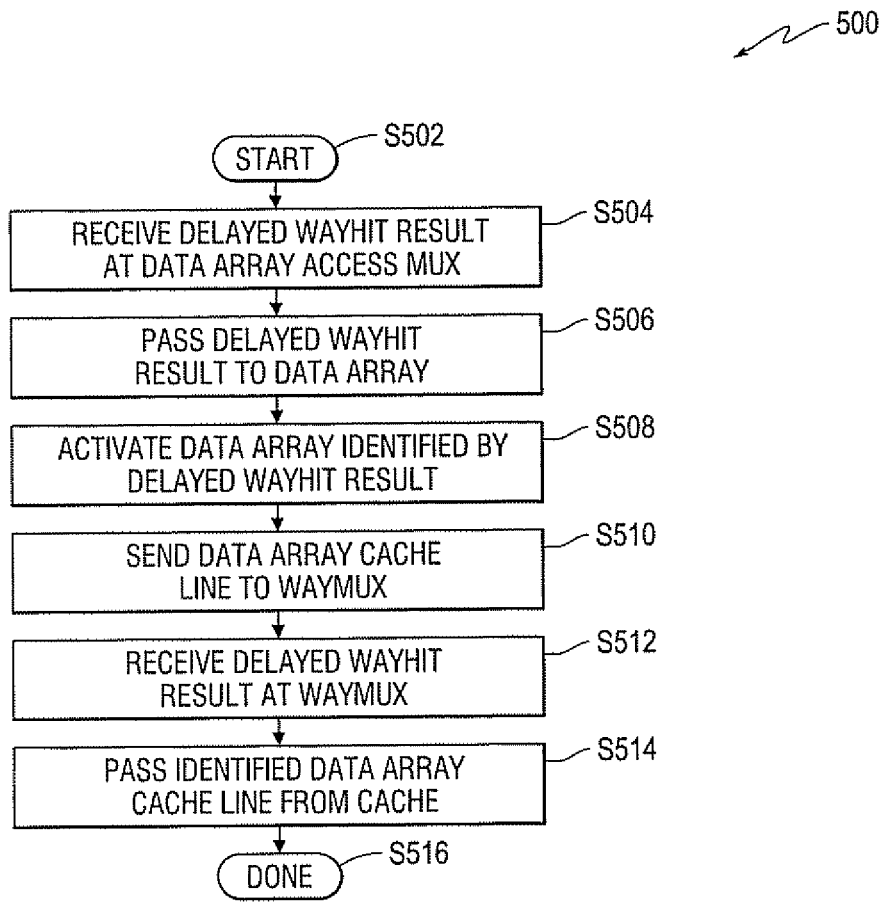
FIG. 5 is a flow-chart of an example process flow that may be performed by a data array unit within the programmable cache of FIG. 1 when operating in serial mode.

FIG. 5 is a flow-chart of an example process flow that can be performed by a data array unit within the programmable cache of FIG. 1 when operating in serial mode during a second cache clock cycle of an in series cache access, i.e., a cache access initiated when the parallel_serial_cntrl parameter has been set to serial mode by the cache controller based on a monitored status of the cache performance, as described above with respect to FIG. 3. It is assumed in the process described below with respect to FIG. 5 that a first portion of the serial cache access has been performed in accordance with the process described above with respect to FIG. 4. As shown in FIG. 5, operation of process 500 begins at step S502 and proceeds to step S504.

In step S504, data array multiplexer 114 receives a delayed wayhit result from read_enable delay module 112 which stored the wayhit result generated during the previous cache clock cycle as described above with respect to FIG. 4 at step S412, and operation of the process continues to step S506.

In step S506, data array multiplexer 114, under the control of a parallel_serial_cntrl parameter that has been set by the cache controller to serial mode, passes the delayed wayhit result to N-way data array unit 116, and operation of the process continues to step S508.

In step S508, based on the data contained within the delayed wayhit result parameter, a single data array within N-way data array unit 116 is activated, and operation of the process continues to step S510.

In step S510, the data array within N-way data array unit 116 activated by delayed wayhit result parameter sends a cache line to waymux 118, and operation of the process continues to step S512.

In step S512, waymux 118 receives, via wayhit multiplexer 108, operating under the control of the parallel_serial_cntrl parameter which has been set by the cache controller to serial mode, the delayed wayhit result from wayhit result delay module 106 which stored the wayhit result generated during the previous cache clock cycle as described above with respect to FIG. 4 at step S412, and operation of the process continues to step S514.

In step S514, waymux 118 passes the cache line received from the activated data array as cache output data, and operation of the terminates at step S516.

It is noted that the cache line passed from waymux 118 during the second clock cycle of the serial cache access corresponds to, and is produced in response to the request tag received by wayhit comparator during the first cache cycle, as described above with respect to FIG. 4 at step S404. Passing of the cache line from waymux 118 in step S514 completes the serial cache access.

Figure 6:
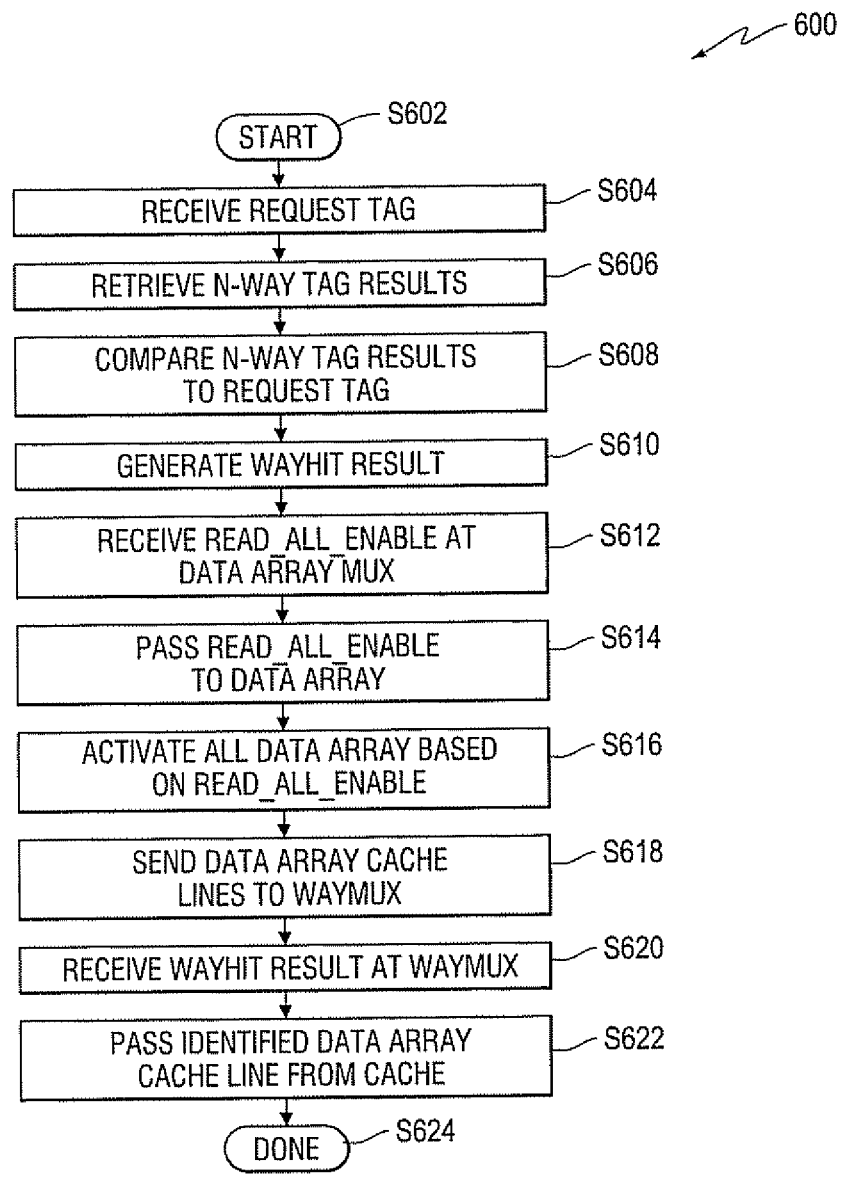
FIG. 6 is a flow-chart of an example process flow that may be performed by the programmable cache of FIG. 1 to process cache access requests when operating in parallel mode.

FIG. 6 is a flow-chart of an example process flow that can be performed by the programmable cache of FIG. 1 to process cache access requests when operating in parallel mode, i.e., when the parallel_serial_cntrl parameter has been set to indicate parallel mode by the cache controller based on a monitored status of the cache performance, as described above with respect to FIG. 3. As shown in FIG. 6, operation of process 600 begins at step S602 and proceeds to step S604.

In step S604, wayhit comparator 104 receives a request tag, and operation of the process continues to step S606.

In step S606, wayhit comparator 104 retrieves N-way tag results from tag array unit 102 based on a tag request based on the received request tag, and operation of the process continues to step S608.

In step S608, wayhit comparator 104 compares the N-way tag results received from tag array unit 102 to the request tag received in step S604, and operation of the process continues to step S610.

In step S610, wayhit comparator 104 generates a way hit result, based on the comparison of the received request tag and the N-way tag results in step S608, and operation of the process continues to step S612.

In step S612, a default read_all_enable parameter is received by data array multiplexer 114, and operation of the process continues to step S614.

In step S614, data array multiplexer 114, under the control of a parallel_serial_cntrl parameter that has been set by the cache controller to parallel mode, passes the read_all_enable parameter to N-way data array unit 116, and operation of the process continues to step S616.

In step S616, based on the data contained within the read_all_enable parameter, each data array within N-way data array unit 116 is activated, and operation of the process continues to step S618.

In step S618, each data array within N-way data array unit 116, all of which have been activated by the read_all_enable parameter received from data array multiplexer 114, sends a cache line to waymux 118, and operation of the process continues to step S620.

In step S620, waymux 118 receives, via wayhit multiplexer 108, operating under the control of the parallel_serial_cntrl parameter which has been set by the cache controller to parallel mode, the wayhit result generated by wayhit comparator 104 during the current cache cycle as described above at step S610, and operation of the process continues to step S622.

In step S622, waymux 118 passes one of the cache lines received from the activated data arrays as cache output data based on the content of the received wayhit result, and operation of the process terminates at step S624.

It is noted that the parallel cache access described above with respect to FIG. 6 is performed during a single cache cycle, as opposed to the 2 cache cycles required to complete the serial cache access described above with respect to FIG. 4 and FIG. 5. Further, it is noted that steps S612 through S618, as described above with respect to FIG. 6, can be performed in parallel with steps S604 through S610, such that the way hit result generated at step S610 and the data array cache lines forwarded at step S618 are provided to waymux 118 during the same cache cycle. Passing of the cache line from waymux 118 in step S622 completes the in parallel cache access initiated by receipt of the request tag received by wayhit comparator, as described at step S604.

Figure 7:
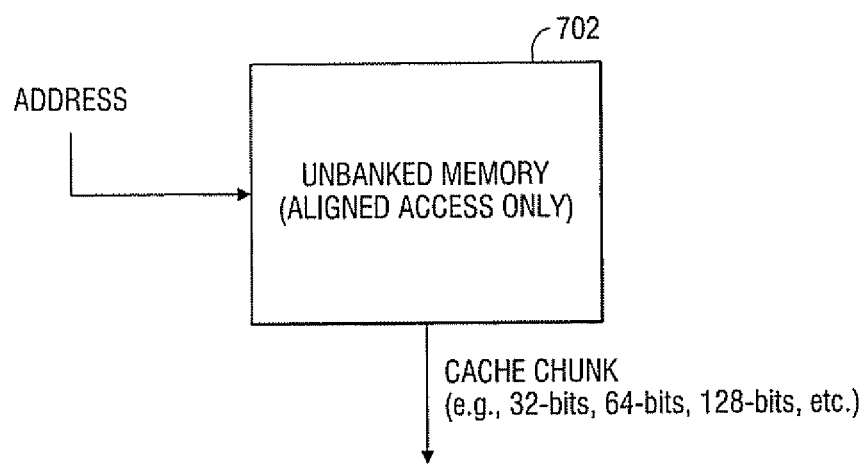
FIG. 7 is a block diagram of a non-banked cache memory that supports storage and retrieval of cache lines.

FIG. 7 is a block diagram of a non-banked cache memory 702 that supports aligned storage and retrieval of cache line chunks, or cache chunks. For example, non-banked cache memory 702 can be configured to retrieve cache chunks of any size, which may include but are not limited to 32-bit chunks, 64-bit chunks, 128-bit chunks, 256-bit chunks, 512-bit chunks, etc. With respect to FIG. 7, in response to an access request that provides a memory address, the non-banked memory will supply a single cache chunk. e.g., 64-bits, or a double-word, of data. However, a cycle performance loss can occur if the non-banked memory is used to store instructions, e.g., 2 instructions per cache chunk, and the instructions that are needed are not naturally aligned to the width of the cache/fetch logic. For example, in a dual-issue microprocessor, with a two-instruction (double-word) wide cache/fetch unit, if there is a branch to the 2nd half of the double-word boundary, only one instruction would be able to be provided in the first access. In this example, if the cache/fetch logic could still supply two instructions even when the two instructions would cross a double-word boundary, performance would be gained.

Figure 8:
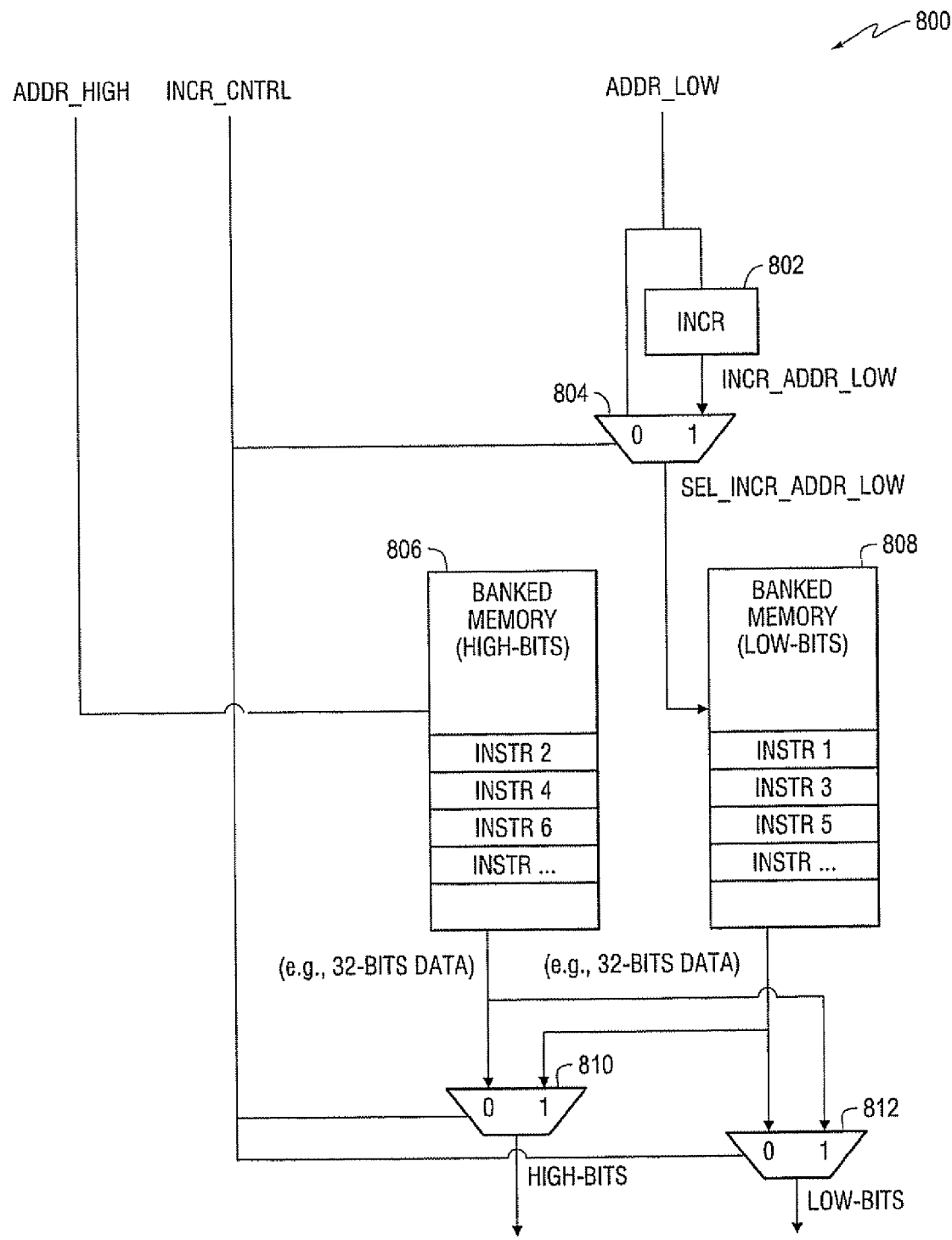
FIG. 8 is a schematic diagram of a banked cache memory that supports aligned and unaligned instruction fetches using a banked access strategy.

FIG. 8 is a schematic diagram of a banked cache memory that supports aligned and unaligned instruction fetches using a banked access strategy. For example, for each array structure that requires unaligned access, e.g., such as an instruction cache, the array can be organized into banks, e.g., an even bank for the low-order word of an aligned access, and an odd bank for the high order word. Each bank can hold a portion of the complete data required, e.g., in an instruction cache, each bank can hold one of two stored instructions within one full cache access that is stored across the two banks. The banks can then be independently addressed.

In cases where an unaligned access is desired, the address to the odd bank can be incremented, as described in greater detail below. For example, for the unaligned access case, a multiplexer can be used to swap the data from each bank to assemble the final quantity. Often this multiplexer can be an extension of other multiplexers already present in a typical design, e.g., such as source selection multiplexers. The approach allows for aligned and unaligned data accesses and therefore increased cycle performance with minimal impact to frequency performance.

As shown in FIG. 8, a banked cache memory 800 that supports aligned and unaligned instruction fetches using a banked access strategy can include a low address incrementor 802, a low address selector 804, a high-bit banked memory 806, a low-bit banked memory 808, a high-bits selection multiplexer 810 and a low-bits selection multiplexer 812.

High-bit banked memory 806 can be used to store the high bits of a stored cache chunk, e.g., the high 32 bits of a 64-bit cache chunk. Low-bit banked memory 808 can be used to store the low bits of a stored cache chunk, e.g., the low 32 bits of a 64-bit cache chunk. Low address incrementor 802 increments the low address received from a cache controller, as described in greater detail below. Low address selector 804 selectively controls whether a non-incremented low address is used to access low-bit banked memory 808 or whether an incremented low address is used to access low-bit banked memory 808, as described in greater detail below. High-bits selection multiplexer 810 and a low-bits selection multiplexer 812 can be used to combine the portions of the cache chunk output retrieved from each of high-bit banked memory 806 and low-bit banked memory 808. In cases where a non-aligned cache access is performed, i.e., in cases where an incremented low address is used to access low-bit banked memory 808, high-bits selection multiplexer 810 and a low-bits selection multiplexer 812 can be controlled to swap the positions of the output from low-bit banked memory 808 and high-bit banked memory 806 to place the instructions contained within in proper sequential order.

Figure 9:
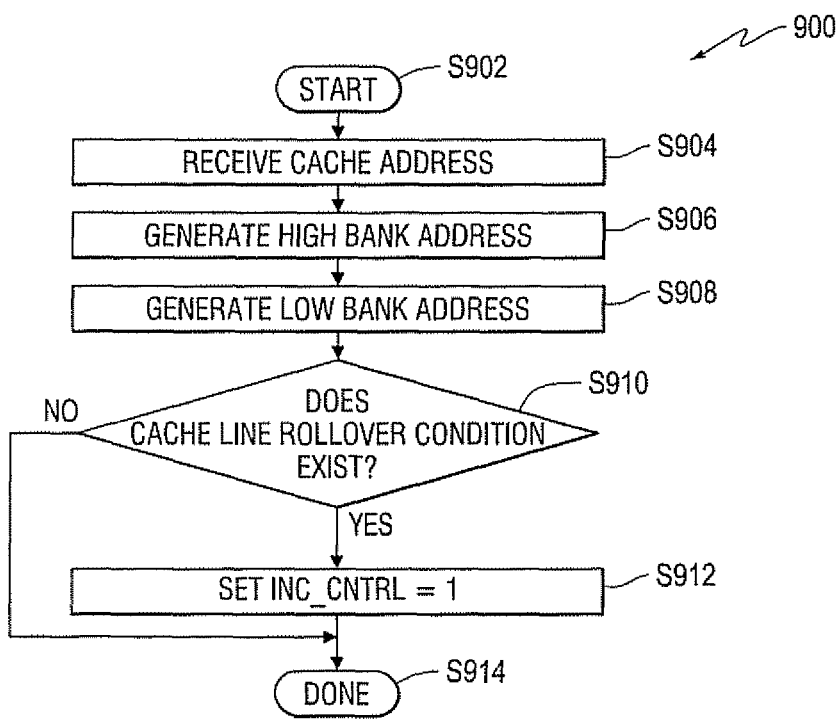
FIG. 9 is a flow-chart of an example process flow that may be performed by the banked cache memory of FIG. 8 to assess a received cache address.

FIG. 9 is a flow-chart of an example process flow that can be performed by the banked cache memory of FIG. 8 to assess a received cache address. As shown in FIG. 9, operation of process 900 begins at step S902 and proceeds to step S904.

In step S904, a cache controller (not shown in FIG. 8) receives a cache address associated with a cache access request, and operation of the process continues to step S906.

In step S906, the cache controller generates a high bank address appropriate for accessing high-bit banked memory 806, and operation of the process continues to step S908.

In step S908, the cache controller generates a low bank address appropriate for accessing low-bit banked memory 808, and operation of the process continues to step S910.

If, in step S910, the cache controller determines, e.g., based on an analysis of the low order bits of the cache address received in step S904, above, that a requested cache chunk rollover condition exists, i.e., that a non-aligned cache access request is required for efficiency purposes, operation of the process continues to step S912; otherwise, operation of the process continues to step S914.

In step S912, the cache controller sets a control parameter, e.g., inc_cntrl, to indicate that a non-aligned cache access request is to be performed, and operation of the process continues to step S914.

In step S914, the process terminates.

Figure 10:
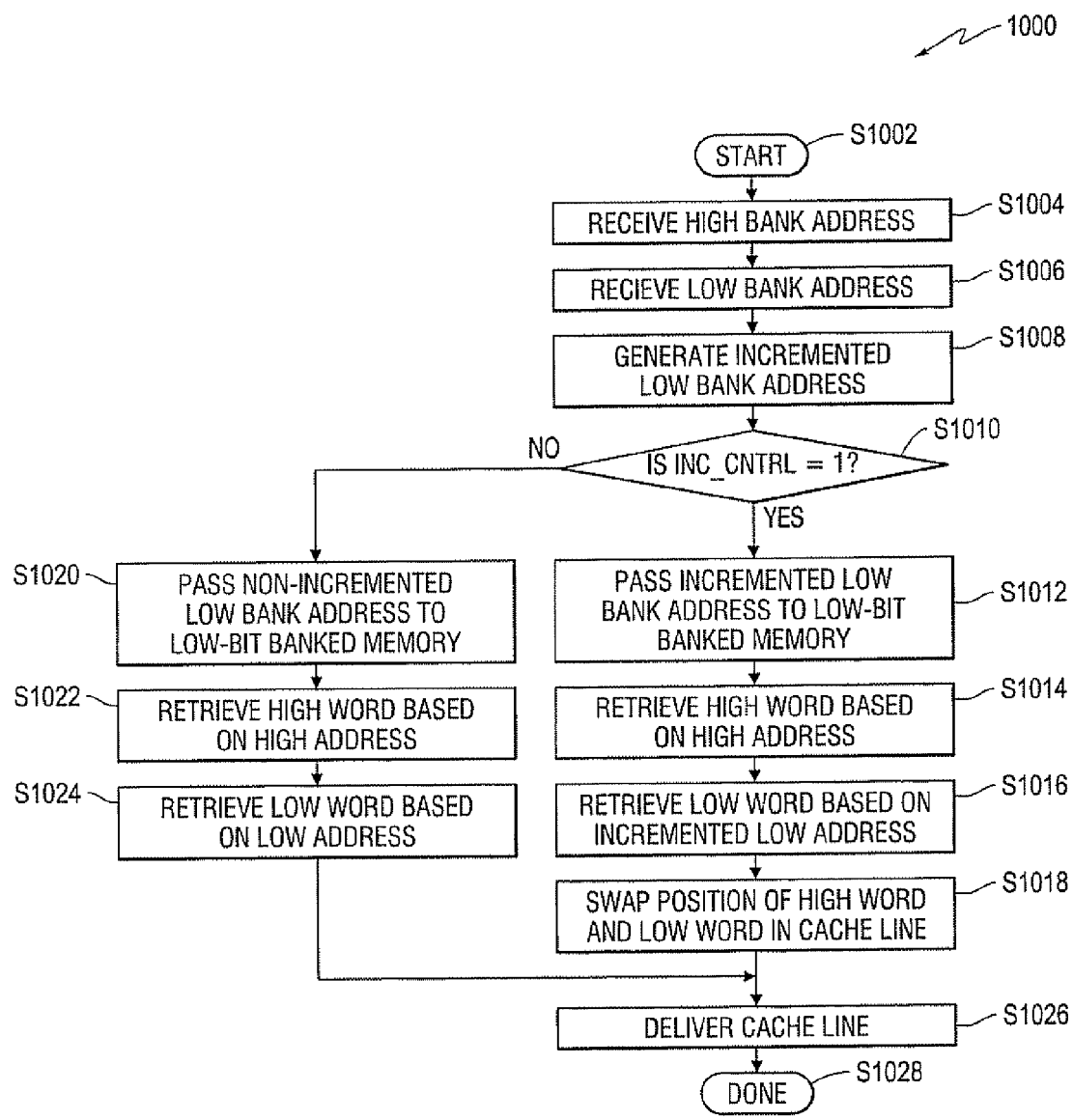
FIG. 10 is a flow-chart of an example process flow that may be performed by the banked cache memory of FIG. 8 to access a banked memory cache based on a received cache address.

FIG. 10 is a flow-chart of an example process flow that can be performed by the banked cache memory of FIG. 8 to perform either an aligned or a non-aligned access to a banked memory cache based on a received cache address. As shown in FIG. 10, operation of process 1000 begins at step S1002 and proceeds to step S1004.

In step S1004, a cache controller (not shown in FIG. 8) generates, or receives, a high bank address appropriate for accessing high-bit banked memory 806 and passes the high bank address to high-bit banked memory 806, and operation of the process continues to step S1006.

In step S1006, the cache controller generates, or receives, a low bank address appropriate for accessing low-bit banked memory 808 and passes the low bank address to low address incrementor 802 and low address selector 804, and operation of the process continues to step S1008.

In step S1008, low address incrementor 802 generates an incremented low bank address based on the received low bank address, and operation of the process continues to step S1010.

If, in step S1010, the inc_cntrl parameter is set to indicate a non-aligned cache access request, operation of the process continues to step S1012; otherwise, operation of the process continues to step S1020.

In step S1012, low address selector 804 passes the incremented low bank address generated by low address incrementor 802 in step S1008, above, to low-bit banked memory 808, and operation of the process continues to step S1014.

In step S1014, low-bit banked memory 808 retrieves and passes to low-bits selection multiplexer 812 a data segment based on the incremented low bank address, and operation of the process continues to step S1016.

In step S1016, high-bit banked memory 806 retrieves and passes to high-bits selection multiplexer 810 a data segment based on the high bank address received in step S1004, and operation of the process continues to step S1018.

In step S1018, high-bits selection multiplexer 810 and a low-bits selection multiplexer 812 can be controlled, e.g., by the same control signal, incr_cntrl, used to control low address selector 804, to swap the low order data segment to a high order position in the generated cache chunk, and may swap the high order data segment to a low order position in the generated cache chunk, and operation of the process continues to step S1026.

In step S1026, bank multiplexer 810 transfers the generated non-aligned cache chunk as the response to the current cache access request, and the process terminates at step S1028.

In step S1020, low address selector 804 passes the low bank address received in step S1006, above, to low-bit banked memory 808, and operation of the process continues to step S1022.

In step S1022, high-bit banked memory 806 retrieves and passes to high-bits selection multiplexer 810 a data segment based on the high bank address received in step S1004, and operation of the process continues to step S1024.

In step S1024, low-bit banked memory 808 retrieves and passes to low-bits selection multiplexer 812 a data segment based on the low bank address received in step S1006, and operation of the process continues to step S1026.

In step S1026, high-bits selection multiplexer 810 and a low-bits selection multiplexer 812 transfer the generated aligned cache chunk as the response to the current cache access request, and the process terminates at step S1028.

Figure 11:
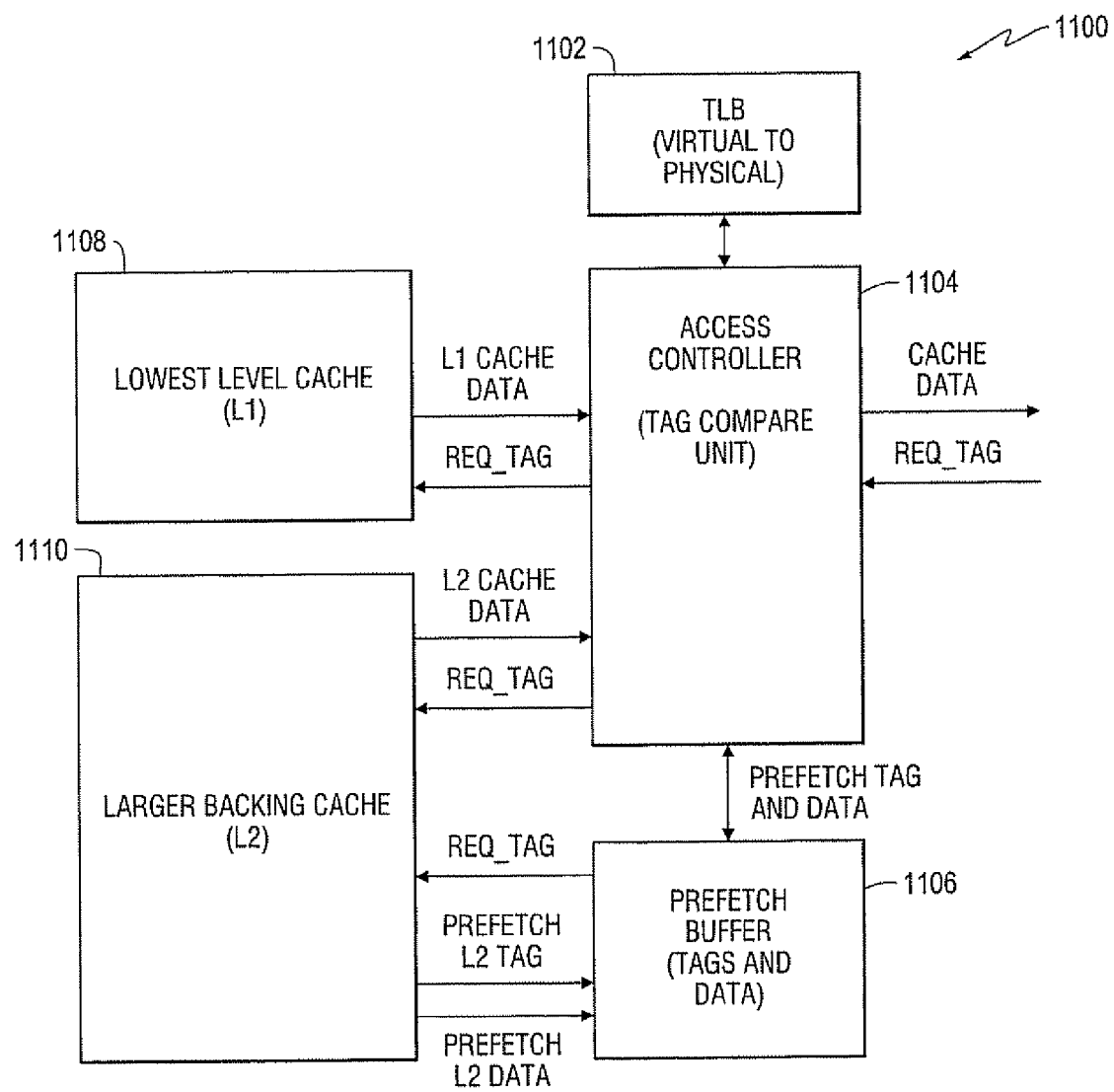
FIG. 11 is a schematic diagram of a cache access controller with prefetch capability in accordance with an embodiment of the disclosure.

FIG. 11 is a schematic diagram of a cache access controller with prefetch capability in accordance with an embodiment of the disclosure.

Typically, the size of the lowest-level cache in a microprocessor has a direct impact on the frequency performance and cycle performance of the microprocessor. To achieve fast frequency performance, the cache may need to be made small, yet a small cache could have a cycle performance impact due to lower hit rate. One solution to this issue would be to have multi-levels of cache, e.g., in which the closest level of cache can be made smaller if there is a larger cache behind the smaller cache to offset the low-hit rate of the smaller cache. However there may still be cycle performance degradation if the lowest level cache consistently needs to get data from the next level. One approach for addressing such a condition is to provide a mechanism by which data may be prefetched from an outer level of a cache to the inner level. More specifically, such a mechanism would perform such prefetching without incurring a hardware structural hazard related to the translation lookaside buffer (TLB) structure.

As an example, in an instruction cache, instructions are typically stored in sequential order. Therefore, if a required cache line is not present in the lowest level cache, it is quite likely that the next sequential line after the first line will also be required. When a cache miss is detected in the lowest level cache, the next level cache will supply the needed data. The next level cache can also opportunistically lookup the next sequential line (e.g. pre-fetch), and if present, the next level cache can make the line available to the lowest level cache via a prefetch buffer. If the lowest-level cache does require data in the prefetch buffer, a subsequent prefetch request to the next level cache is made for the next sequential line after the address of the line contained in the prefetch buffer. This process may continue until the line in the prefetch buffer is not the line that is required next (due to branch instruction or exception flush), or if it is found that the line in the prefetch buffer was already present in the lowest level cache.

This next-line determination can be a simple calculation in the common sequentially addressed case. The address to prefetch may be obtained by incrementing the current address by the cache-line size of the microprocessor. However in a physically-tagged cache, the next line may not be a simple increment of the current line when a page boundary is crossed. In this case, a TLB lookup would be required to obtain the address of the next line, which could result in a structural hazard on the TLB (or page-miss handler) if the next line is also being used by the lowest-level cache, e.g., the address prior to the prefetch. To manage this situation, prefetching may cease upon crossing a page boundary.

When the lowest-level cache is being accessed, the prefetch buffer is also accessed in parallel. If the line needed is found in the prefetch buffer, the line will then be written to the lowest-level cache, and subsequently trigger the next prefetch. One option used to lessen the burden on the TLB in a physically-tagged caching strategy may use a virtual address match for the prefetch buffer. Such an approach has the advantage of avoiding any frequency-limitations of using the translated address from the TLB (e.g. physical address). Note, that for this approach to be functionally equivalent, the prefetch buffer can be flushed upon context switch.

FIG. 11 shows a cache controller 1100 with prefetch capability in accordance with an embodiment of the disclosure. The cache controller 1100 includes a virtual address to physical address TLB 1102, an access controller 1104, a prefetch buffer 1106, a lowest level (L1) cache 1108 and a larger backing (L2) cache 1110. Access controller 1104 controls response of cache controller 1100 to external cache access requests. Access controller 1104 also coordinates virtual-to-physical address lookups from TLB 1102, cache accesses to L1 cache 1108, cache accesses to L2 cache 1110, and prefetch cache requests from prefetch buffer 1106 to cache accesses to L2 cache 1110, as described below.

Figure 12:
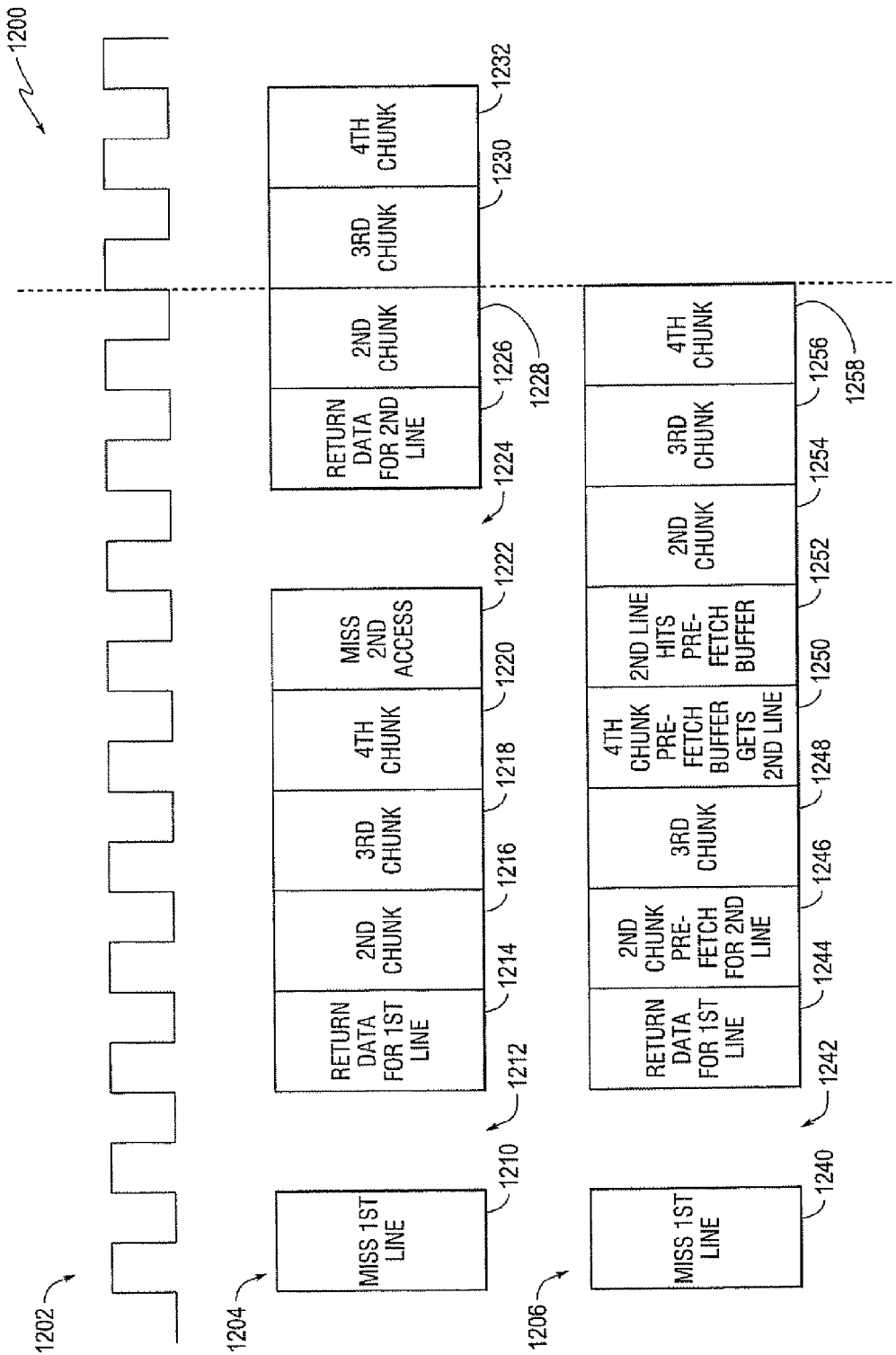
FIG. 12 is a comparison of the cache misses that may be generated by the cache access controller of FIG. 11, without and with the used of the described prefetch capability.

FIG. 12 is a comparison of the cache misses that can be generated by the cache access controller of FIG. 11, without and with the use of the described prefetch capability. For example, using the process flow described below with respect to FIG. 13, access controller 1100 can avoid cache misses that would otherwise have occurred, e.g., as shown in FIG. 12 at 1224, had the described prefetch capability not been used. Further, as a result of the use of the described prefetch capability, cache accesses, such as those shown in FIG. 12 at 1206, can be completed earlier than the same cache accesses, e.g., as shown in FIG. 12 at 1204, performed without the prefetch capability and which, as a result, experience cache misses that would likely have been avoided using the described prefetch capability.

Figure 13:
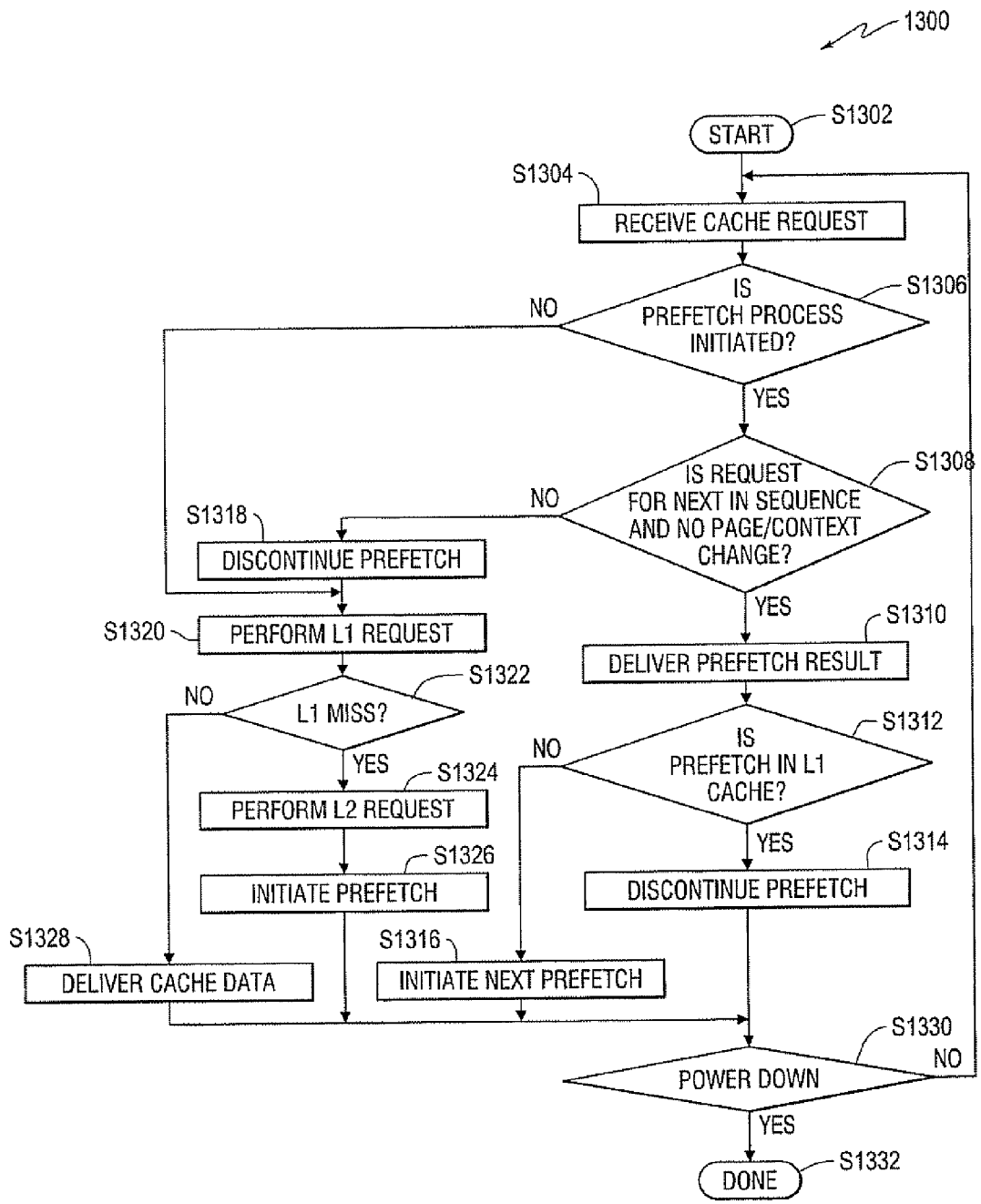
FIG. 13 is a flow-chart of an example process flow that may be performed by the cache access controller of FIG. 11 to control prefetch cache retrievals.

FIG. 13 is a flow-chart of an example process flow that can be performed by cache controller 1100 to control prefetch cache retrievals. As shown in FIG. 13, operation of process 1300 begins at step S1302 and proceeds to step S1304.

In step S1304, access controller 104 receives a request tag, e.g., a cache request, and operation of the process continues to step S1306.

If, in step S1306, access controller 104 determines that a prefetch process has already been initiated, operation of the process continues to step S1308; otherwise, operation of the process continues to step S1320.

If, in step S1308, access controller 104 determines that the request is for a next cache line in sequence and the cache access will not experience a page change or a context change in performing the cache access, operation of the process continues to step S1310; otherwise, operation of the process continues to step S1318.

In step S1310, access controller 104 receives a prefetch result from prefetch buffer 1106, and returns the prefetch buffer as the cache data response to the received cache access request, and operation of the process continues to step S1312.

If, in step S1312, access controller 104 determines that the prefetch buffer contents received in step S1310 was already contained in L1 cache 1108, operation of the process continues to step S1314; otherwise, operation of the process continues to step S1316.

In step S1314, access controller 104 instructs prefetch buffer 1106 to discontinue the current prefetch process, and operation of the process continues to step S1330.

In step S1316, access controller 104 instructs prefetch buffer 1106 to initiate the next prefetch operation within the current prefetch process, and operation of the process continues to step S1330.

In step S1318, access controller 104 instructs prefetch buffer 1106 to discontinue the current prefetch process, and operation of the process continues to step S1320.

In step S1320, access controller 104 initiates an L1 cache access, and operation of the process continues to step S1322.

If, in step S1322, access controller 104 determines that the L1 cache access has resulted in an L1 cache miss, operation of the process continues to step S1324; otherwise, operation of the process continues to step S1328.

In step S1328, access controller 104 receives the L1 cache access result, and returns the L1 cache access result as the cache data response to the received cache access request, and operation of the process continues to step S1330.

In step S1324, access controller 104 initiates an L2 cache access request, and operation of the process continues to step S1326.

In step S1326, access controller 104 instructs prefetch buffer 1106 to initiate a prefetch process, and operation of the process continues to step S1330.

If, in step S1330, access controller 104 determines that a power down request has been received, operation of the process continues to step S1332 and the process terminates; otherwise, operation of the process continues to step S1304.

For purposes of explanation in the above description, numerous specific details are set forth in order to provide a thorough understanding of the described programmable cache and cache access protocol that optimizes power consumption and performance, the described banked cache memory that supports aligned and unaligned instruction fetches using a banked access strategy, and the described cache access controller that includes a prefetch capability. It will be apparent, however, to one skilled in the art that the described programmable cache and cache access protocol, the described banked cache memory that supports aligned and unaligned instruction fetches using a banked access strategy, and the described cache access controller that includes a prefetch capability can be practiced without these specific details. In other instances, various structures and devices are shown in block diagram form in order to avoid obscuring the features of the described programmable cache and cache access protocol, the described banked cache memory that supports aligned and unaligned instruction fetches using a banked access strategy, and the described cache access controller that includes a prefetch capability.

While the programmable cache and cache access protocol, the banked cache memory that supports aligned and unaligned instruction fetches using a banked access strategy, and the cache access controller that includes a prefetch capability have been described in conjunction with the specific embodiments thereof, many alternatives, modifications, and variations may be made to the embodiments described above. Accordingly, embodiments of the programmable cache and cache access protocol, the banked cache memory that supports aligned and unaligned instruction fetches using a banked access strategy, and the cache access controller that includes a prefetch capability, as set forth herein, are intended to be illustrative, not limiting. There are changes that may be made without departing from the scope of the invention and the claims set forth below.

What is claimed is:

1. A programmable cache, comprising:
    a tag array unit to forward a wayhit result with a clock cycle delay when the programmable cache operates in a serial mode and forward the wayhit result without the clock cycle delay when the programmable cache operates in a parallel mode;
    a data array unit to generate one of a single data array cache line and multiple data array cache lines based on a configurable control parameter; and
    a cache controller to configure the tag array unit and the data array unit to operate in either parallel or series based on the configurable control parameter.

2. The programmable cache of claim 1, wherein the cache controller further comprises:
    a performance monitoring unit to monitor cache performance and that sets the configurable control parameter based on a determined cache performance.

3. The programmable cache of claim 2, wherein at least one of the cache controller and performance monitoring unit are implemented in hardware.

4. The programmable cache of claim 2, wherein at least one of the cache controller and performance monitoring unit are implemented in software.

5. The programmable cache of claim 2, wherein the performance monitoring unit monitors cache misses and switches the configurable control parameter to configure the tag array unit and the data array unit to operate in parallel if a rate of cache misses exceeds a predetermined threshold.

6. The programmable cache of claim 2, wherein the performance monitoring unit monitors a load use penalty and switches the configurable control parameter to configure the tag array unit and the data array unit to operate in parallel if the load use penalty exceeds a predetermined threshold.

7. The programmable cache of claim 2, wherein the performance monitoring unit monitors cache misses and switches the configurable control parameter to configure the tag array unit and the data array unit to operate in series if a rate of cache misses is at or below a predetermined threshold.

8. The programmable cache of claim 2, wherein the performance monitoring unit monitors a load use penalty and switches the configurable control parameter to configure the tag array unit and the data array unit to operate in series if the load use penalty is at or below a predetermined threshold.

9. A programmable cache, comprising:
    a tag array unit to forward a wayhit result with a clock cycle delay when the programmable cache operates in a serial mode and forward the wayhit result without the clock cycle delay when the programmable cache operates in a parallel mode;
    a data array unit to generate one of a single data array cache line and multiple data array cache lines based on a configurable control parameter; and
    a cache controller to configure the tag array unit and the data array unit to operate in either parallel or series based on the configurable control parameter,
    wherein the tag array unit further comprises:
        an N-way tag array that includes N tag arrays; and
        a wayhit comparator to initiate a search of the N-way tag array based on a received request tag and compare results received from the N tag arrays to produce a wayhit result that indicates which of the tag arrays contained data matching the request tag.

10. The programmable cache of claim 9, wherein the tag array unit further comprises:
- a first delay module to receive the wayhit result and store the wayhit result for one clock cycle to produce a delayed wayhit result.

11. The programmable cache of claim 10, wherein the tag array unit further comprises:
- a wayhit multiplexer to receive the wayhit result and the delayed wayhit results and pass one of the wayhit result and the delayed wayhit based on the configurable control parameter.

12. The programmable cache of claim 11, wherein the data array unit further comprises:
- an N-way data array that includes N data arrays; and
- a waymux multiplexer to receive data from one or more of the N data arrays and pass a selected one of the data received from one of the N data arrays based on one of the wayhit result and the delayed wayhit received from the wayhit multiplexer.

13. The programmable cache of claim 12, wherein the data array unit further comprises:
- a read all unit to generate a read all enable value that is used to instruct each data array to output a cache line to the waymux multiplexer;
- a signal generator to receive the wayhit result and the read all enable value and produce a wayhit read enable signal value that is used to instruct a single data array to output a cache line to the waymux multiplexer based on the wayhit result; and
- a second delay module to receive the wayhit read enable value and store the read wayhit enable value for one clock cycle to produce a delayed wayhit read enable value.

14. The programmable cache of claim 13, wherein the data array unit further comprises:
- a data array multiplexer to receive the delayed wayhit read enable value and the read all enable value and pass to each of the N data arrays one of the delayed wayhit read enable value and the read all enable value based on the configurable control parameter,
- wherein if each of the N data arrays receives the wayhit read enable value, only the data array indicated by the wayhit read enable value passes a cache line to the waymux multiplexer, and
- wherein if each of the N data arrays receives the read all enable value, each of the data arrays passes a cache line to the waymux multiplexer.

15. A method of controlling a programmable cache, the method comprising:
- forwarding a wayhit result with a clock cycle delay when the programmable cache operates in a serial mode and forward the wayhit result without the clock cycle delay when the programmable cache operates in a parallel mode;
- generating one of a single data array cache line and multiple data array cache lines based on a configurable control parameter; and
- configuring a tag array unit and a data array unit to operate in either parallel or series based on the configurable control parameter.

16. The method of claim 15, further comprising:
- monitoring a performance of the cache and setting the configurable control parameter based on the monitored cache performance.

17. The method of claim 16, wherein monitoring a performance of the cache further comprises:
- monitoring cache misses and switching the configurable control parameter to configure the tag array unit and the data array unit to operate in parallel if a rate of cache misses exceeds a predetermined threshold.

18. The method of claim 16, wherein monitoring a performance of the cache further comprises:
- monitoring a load use penalty and switching the configurable control parameter to configure the tag array unit and the data array unit to operate in parallel if the load use penalty exceeds a predetermined threshold.

19. The method of claim 16, wherein monitoring a performance of the cache further comprises:
- monitoring cache misses and switching the configurable control parameter to configure the tag array unit and the data array unit to operate in series if a rate of cache misses is at or below a predetermined threshold.

20. The method of claim 16, wherein monitoring a performance of the cache further comprises:
- monitoring a load use penalty and switching the configurable control parameter to configure the tag array unit and the data array unit to operate in series if the load use penalty is at or below a predetermined threshold.

* * * * *